US007922038B2

(12) United States Patent
Cheng

(10) Patent No.: US 7,922,038 B2
(45) Date of Patent: Apr. 12, 2011

(54) LOTTERY TICKET MACHINE HAVING FUNCTION OF PREVENTING TICKETS FROM BEING ILLEGALLY DRAWN OUT

(76) Inventor: Yun-Lan Cheng, Tainan (TW)

( * ) Notice: Subject to any disclaimer, the term of this patent is extended or adjusted under 35 U.S.C. 154(b) by 365 days.

(21) Appl. No.: 12/182,155

(22) Filed: Jul. 30, 2008

(65) Prior Publication Data

US 2010/0025423 A1 Feb. 4, 2010

(51) Int. Cl.
*B65G 59/00* (2006.01)
*B65H 3/00* (2006.01)
*G07F 11/00* (2006.01)

(52) U.S. Cl. ............ 221/151; 221/7; 221/277; 221/255; 221/152; 221/153; 221/258; 399/167

(58) Field of Classification Search .............. 225/4, 151; 221/151, 7, 277, 255, 152, 153, 258; 399/167
See application file for complete search history.

(56) References Cited

U.S. PATENT DOCUMENTS 5,803,308 A * 9/1998 Rong ................................ 221/7
6,036,052 A * 3/2000 Tong ............................. 221/259
6,053,358 A * 4/2000 Tong ............................. 221/151
6,752,289 B1 * 6/2004 Lin ................................ 221/30
7,450,886 B2 * 11/2008 Ahn et al. ..................... 399/167
7,850,257 B2 * 12/2010 Roberts et al. ............... 312/34.4
2002/0117528 A1 * 8/2002 Turek ................................ 225/4
2005/0130794 A1 * 6/2005 Jinbo ............................ 475/331
2006/0081674 A1 * 4/2006 Roberts et al. .................... 225/2
2009/0159610 A1 * 6/2009 Woods et al. .................. 221/45

* cited by examiner

*Primary Examiner* — Gene O. Crawford
*Assistant Examiner* — Rakesh Kumar

(57) ABSTRACT

A lottery ticket machine having function of preventing tickets from being illegally drawn out includes a machine base provided thereon with a driving device, two press rollers and a control device. One of the two press rollers is disposed with a shaft extending out of the machine base for assembling the control device, which consists of a rotary gear with engage holes, a bushing and a control wheel bored with a bushing hole to be fitted on the bushing and provided with engage teeth and projecting bars to be respectively engaged with the engage holes of the rotary gear. An outer cover covered on the control device is disposed inside with engage teeth to be correspondingly engaged with the engage teeth of the control wheel, and a spring has its opposite ends respectively pushing against the control wheel and the inner wall of a bushing cover.

9 Claims, 10 Drawing Sheets

LOTTERY TICKET MACHINE HAVING FUNCTION OF PREVENTING TICKETS FROM BEING ILLEGALLY DRAWN OUT

BACKGROUND OF THE INVENTION

1. Field of the Invention

This invention relates to a lottery ticket machine having function of preventing tickets from being illegally drawn out, particularly to one including a machine base provided thereon with a driving device, two press rollers and a control device. One of the two press rollers is disposed with a shaft rod extending out of the machine base for assembling the control device thereon. The control device is orderly composed of a rotary gear, a bushing, a control wheel, a spring, a bushing cover, a fastener and an outer cover. The rotary gear is bored with plural engage holes, and the control wheel has its outer side annularly provided with lots of engage teeth and its rear side fixed thereon with plural projecting members to be respectively engaged with the engage holes of the rotary gear. The outer cover to be covered on the control device is provided inside with lots of engage teeth to be correspondingly engaged with the engage teeth of the control wheel. When the lottery tickets are pulled by force, the control wheel fitted with the combining member of the shaft rod by the bushing will be actuated to rotate and disengage from the rotary gear to have its engage teeth fixedly engaged with the engage teeth of the outer cover. Thus, the press rollers cannot be rotated at all, and hence the lottery tickets are tightly pressed by the press rollers and impossible to be drawn out, able to surely prevent the lottery tickets from being stolen.

2. Description of the Prior Art

A conventional lottery ticket machine, as disclosed in a Taiwan patent No. 352845, titled "LOTTERY TICKET MACHINE ABLE TO PREVENT TICKETS FROM BEING DRAWN OUT", includes a machine base, a press device, a faceplate and an elastic member combined together. The machine base has a front side plate bored with threaded holes, a rear side plate bored with a through hole, a micro-switch, stoppers and slide rails provided in an inner side, with connecting rods fixed between the two side plates for combining them together. The press device is mounted on the slide rails of the side plate of the machine base, having its front upper side provided with a control plate. The faceplate assembled at the front end of the machine base has its front side disposed with a ticket outlet having its upper side formed with a blocking surface and its lower side provided with a guide plate. The ticket outlet further has its topside and its underside respectively secured with a positioning block, and its right and left side respectively provided with a pivotal lug with a threaded hole. The elastic member has its opposite ends respectively hooked with the machine base and the rear side of the press device. By so designing, when the lottery ticket is illegally drawn out by an external force, it will actuate the press device to shift forward on the slide rails to resist against the rear side of the faceplate. At this time, the electromagnetic valve of the machine base will be in an OFF condition, and the control plate of the press device will be stopped by the blocking surface of the faceplate to tightly resist against the guide plate and firmly clamp the lottery ticket for preventing the lottery ticket from being drawn out by a great force, thus surely preventing the lottery tickets from being stolen.

However, after used for a long period of time, the control plate of the press device is likely to produce elastic fatigue and unable to tightly resist the lottery ticket and thus it is impossible to prevent the lottery ticket from being illegally drawn out by a great external force.

SUMMARY OF THE INVENTION

The objective of this invention is to offer a lottery ticket machine having function of preventing tickets from being illegally drawn out.

The feature of this invention is that one of the two press rollers is secured thereon with a shaft extending out of a machine base in the same direction of two pivots of the machine base. The shaft has its outer side disposed with a combining member and an annular engage groove. A control device is fitted on the shaft of the press roller and composed of a rotary gear, a bushing, a control wheel, a spring, a bushing cover, a fastener and an outer cover, The rotary gear is fitted on the shaft of the press roller, driven to rotate by a driven gear of a driving device and bored with more than one engage hole. The bushing is fitted on the combining member of the shaft of the press roller, having its outer side fixed thereon with more than one projecting ridge. The control wheel to be fitted on the bushing is bored with a bushing hole with a shape the same as the bushing and has its outer side annularly provided with plural engage teeth having their inner circumference receiving a spring therein, and its rear side secured thereon with one more projecting member to be correspondingly engaged in the engage hole of the rotary gear. The bushing cover is mounted on the bushing, having its center bored with a bushing hole having a shape the same as the bushing. The spring has another end pushing against the inner wall of the bushing cover. The fastener is clasped in the annular engage groove at the outer end of the shaft of the press roller. The outer cover is threadably combined with a side plate of the machine base for covering both the driving device and the control device, disposed inside with a recess annularly fixed therein with plural engage teeth to be correspondingly engaged with the engage teeth of the control wheel.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
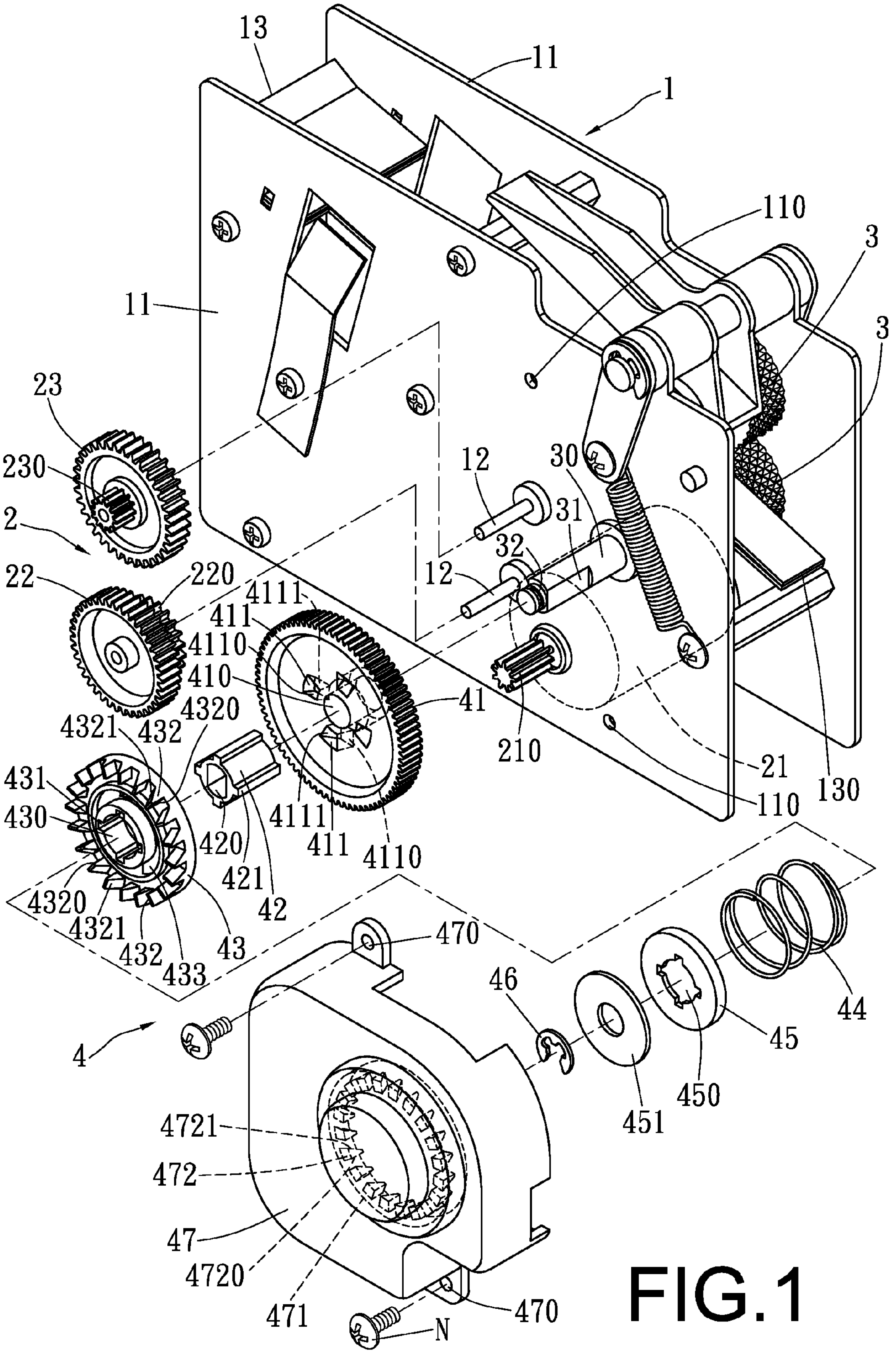
FIG. 1 is an exploded perspective view of a lottery ticket machine in the present invention.
Figure 2:
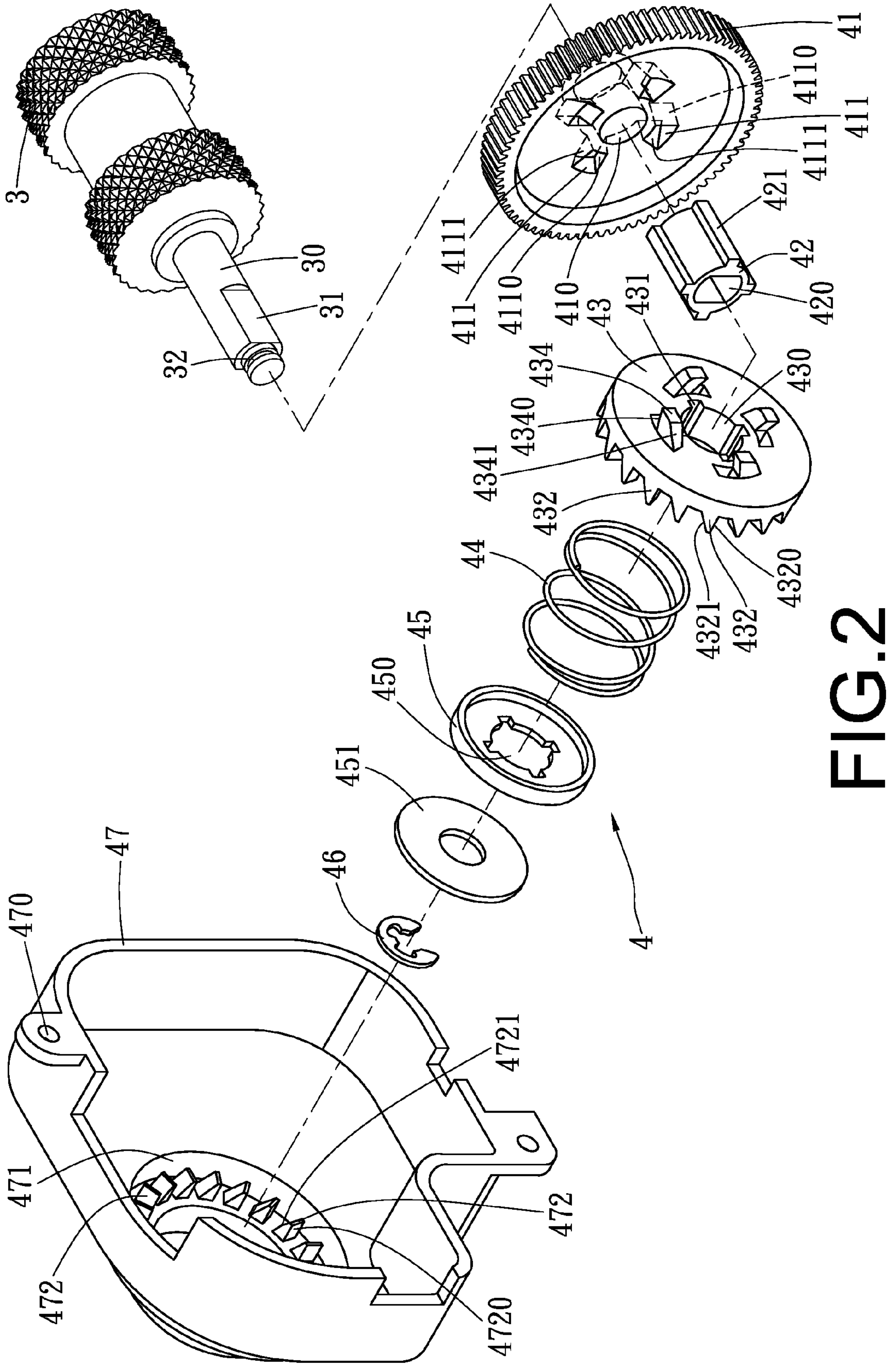
FIG. 2 is an exploded perspective view of a control device of the lottery ticket machine in the present invention.
Figure 3:
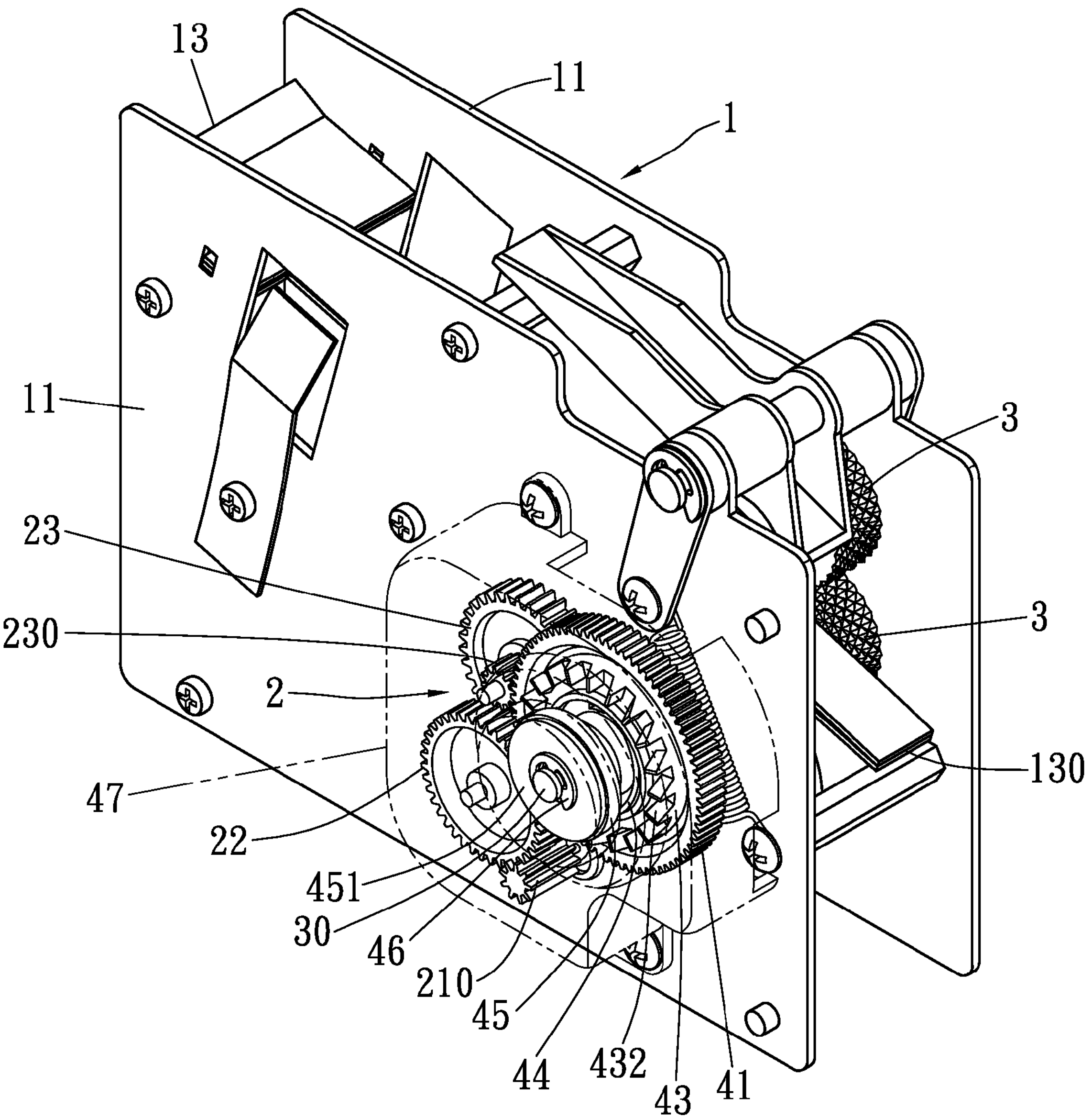
FIG. 3 is a perspective view of the lottery ticket machine in the present invention.

A preferred embodiment of a lottery ticket machine having function of preventing tickets from being illegally drawn out in the present invention, as shown in FIGS. 1, 2 and 3, includes a machine base 1, a driving device 2, two press rollers 3 and a control device 4 as main components combined together.

The machine base 1 is provided with two side plates 11 respectively bored with several threaded holes 110, and one of the two side plates 11 has its outer side secured thereon with two pivots 12. The machine base 1 is disposed in the interior with a lottery ticket circular passageway 13 having its outer end formed with a ticket outlet 130.

The driving device 2 to be assembled in the machine base 1 is composed of a motor 21, a driving gear 22 and a driven gear 23. The motor 21 is provided with a geared shaft 210 extending out of the side plate 11 at the same side of the two pivots 12. The driving gear 22 is pivotally fitted on one pivot 12 of the machine base 1 and engaged with the geared shaft 210 of the motor 21 to be driven to rotate by the geared shaft rod 21, having its rear side fixed thereon with a driving pinion 220. The driven gear 23 is pivotally assembled on the other pivot 12 of the machine base 1 and engaged with the driving pinion 220 of the driving gear 22, having its front side secured thereon with a driven pinion 230.

The two press rollers 3 are assembled in the interior of the machine base 1, and the final part of lottery ticket circular passageway, close to the ticket outlet 13, is extended forward between the two press rollers 3 so that the opposite sides of a lottery ticket (T) can be rolled and pressed by the two press rollers 3. One of the two press rollers 3 is disposed with a shaft 30 extending out of one side plate 11 at the same side of the pivot 12 of the machine base 1. The shaft 30 has its outer side provided with a combining member 31 and an annular engage groove 32.

The control device 4 to be fitted on the shaft 30 of the press roller 3 is composed of a rotary gear 41, a bushing 42, a control wheel 43, a spring 44, a bushing cover 45, a fastener 46 and an outer cover 47. The rotary gear 41 is fitted on the shaft 30 of the press roller 3 and engaged with the driven pinion 230 of the driven gear 23 of the driving device 2, bored with a shaft hole 410 in the center and several engage holes 411 respectively having its inner wall provided with a slope 4110 at one side along a circumferential direction and formed with a parabolic arcuate surface 4111 at another side. The bushing 42 is combined with the combining member 31 at the outer side of the shaft 30 of the press roller 3 and leans on the outer side of the rotary gear 41, bored with a through hole 420 with a shape matching with that of the combining member 31 of the shaft rod 30, and having its outer side disposed with several lengthwise projecting ridges 421. The control wheel 43 to be fitted on the bushing 42 is bored in the center with a bushing hole 430 having the same shape as the bushing 42 and having its inner wall provided with lengthwise positioning slide grooves 431 for respectively engaging with the projecting ridges 421 on the bushing 42 so as to enable the control wheel 43 to slide on the bushing 42. Further, the control wheel 43 has one side annularly provided with plural engage teeth 432 respectively having one side formed with an engage surface 4320 and another side formed with a slope 4321, and the bushing hole 430 of the control wheel 43 has its outer circumference bored with a spring groove 433 for receiving the spring 44 therein. Furthermore, the control wheel 43 has its rear side fixed thereon with a plurality of projecting bars 434 to be respectively engaged with the engage holes 411 of the rotary gear 41, and each projecting bar 434 has its opposite sides respectively formed with a slope 4340 and an arcuate surface 4341 respectively corresponding with the slope 4110 and the arcuate surface 4111 of the engage hole 411 of the rotary gear 41. The bushing cover 45 to be fitted on the bushing 42 is bored in the center with a bushing hole 450 having the same shape as the bushing 42, with one end of the spring 44 pushing against the inner wall of the bushing cover 45, with a gasket 451 mounted at the front side of the bushing cover 45. The fastener 46 is clasped in the annular engage groove 32 at the outer end of the shaft rod 30 of the press roller 3 for firmly positioning the control device 4 on the shaft 30 of the press roller 3. The outer cover 47 is threadably assembled on the side plate 11 of the machine base 1 to cover up both the driving device 2 and the control device 4, bored with plural threaded holes 470 respectively corresponding with the threaded holes 110 of the side plate 11 of the machine base 1, with bolts (N) respectively screwed in the threaded holes 470 and 110 to combine the outer cover 47 together with the side plate 11 of the machine base 1. The outer cover 47 has its inner side disposed with an annular recess 471 annularly fixed therein with lots of engage teeth 472 to be correspondingly engaged with the engage teeth 432 of the control wheel 43, and each engage tooth 471 has one side formed with an engage surface 4720 and another side formed with a slope 4721.

Figure 4:
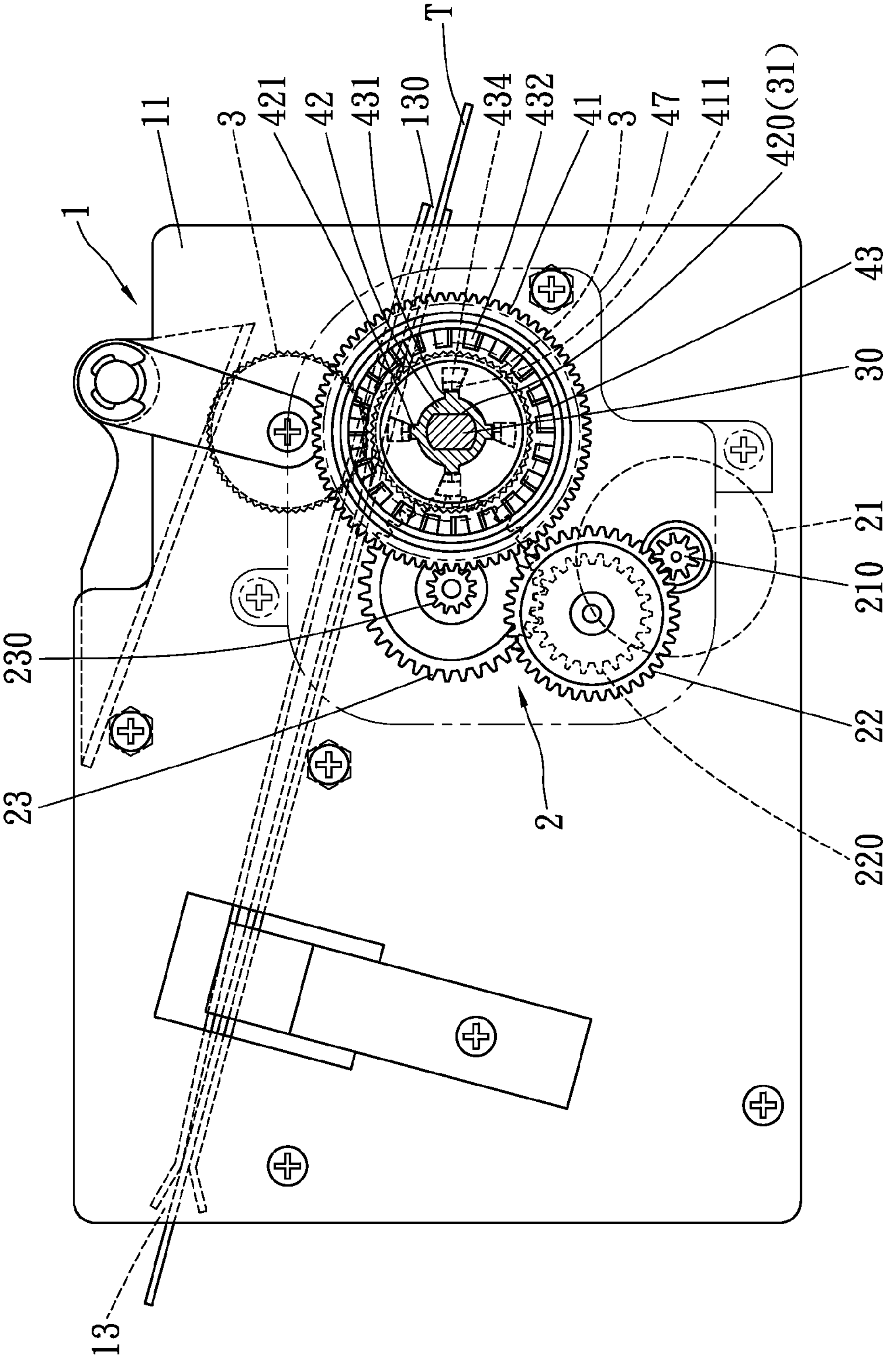
FIG. 4 is a side view of the lottery ticket machine in the present invention.
Figure 5:
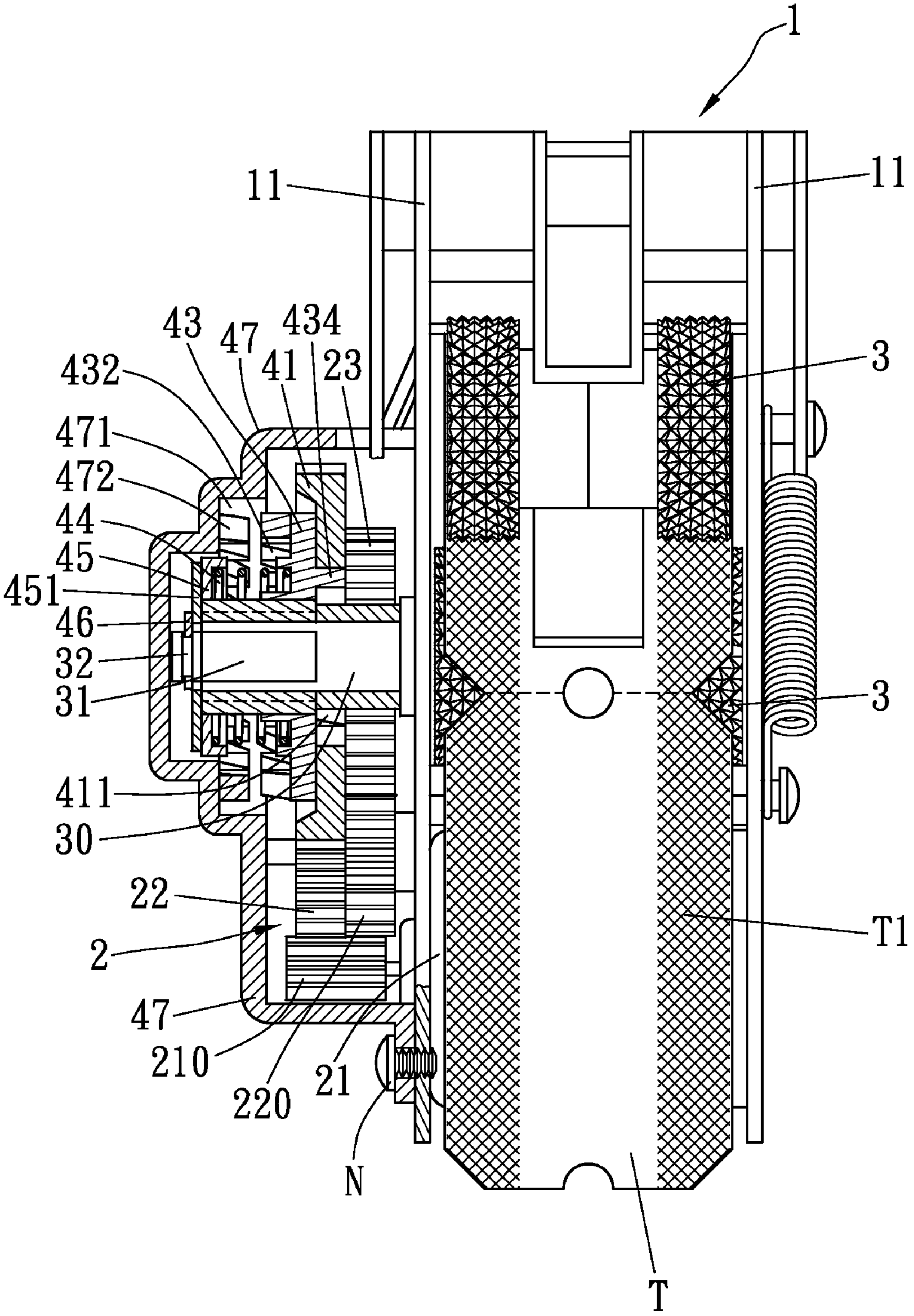
FIG. 5 is a cross-sectional view of the lottery ticket machine in an operating condition in the present invention.
Figure 6:
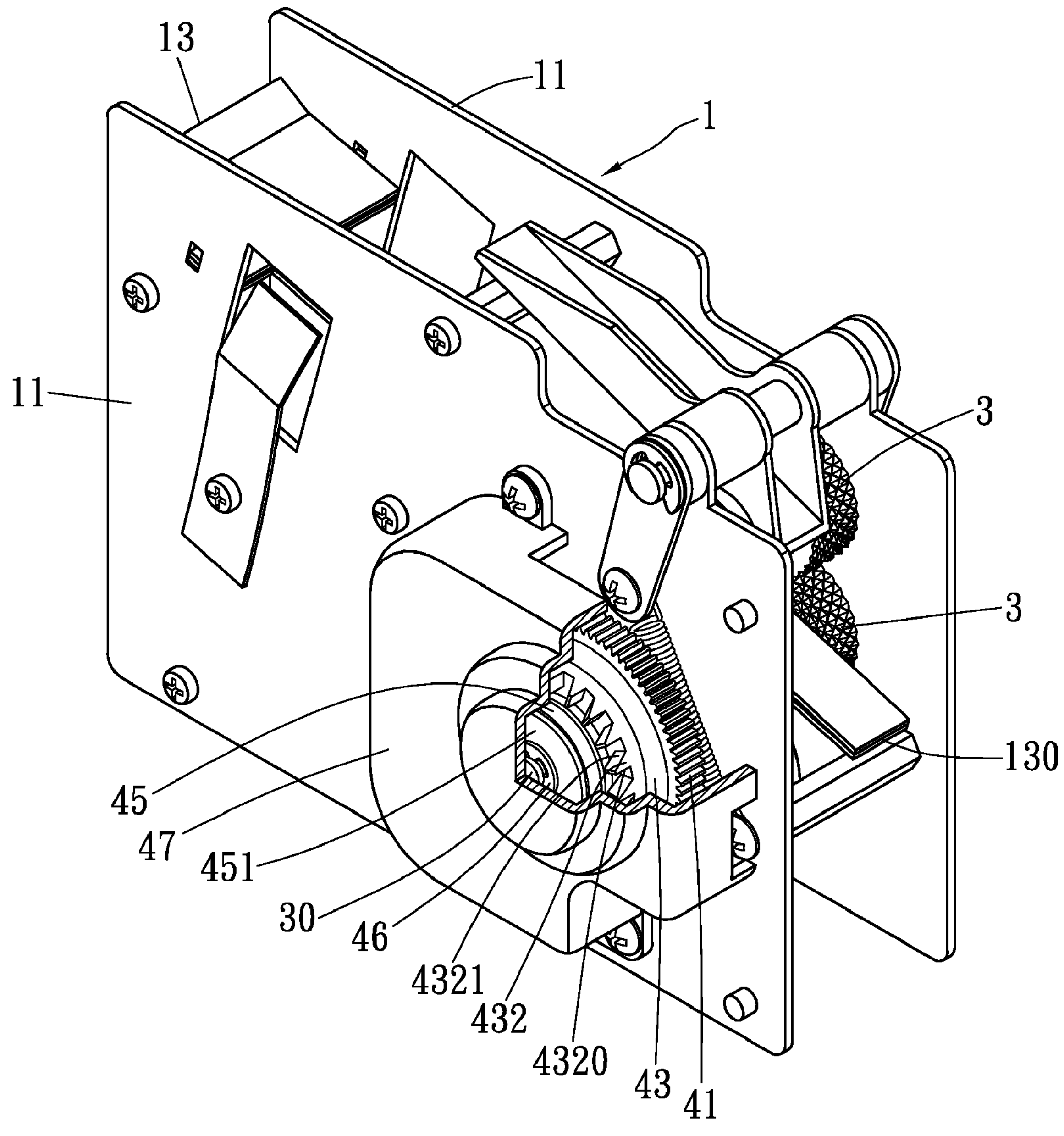
FIG. 6 is another perspective view of the lottery ticket machine in the present invention.
Figure 7:
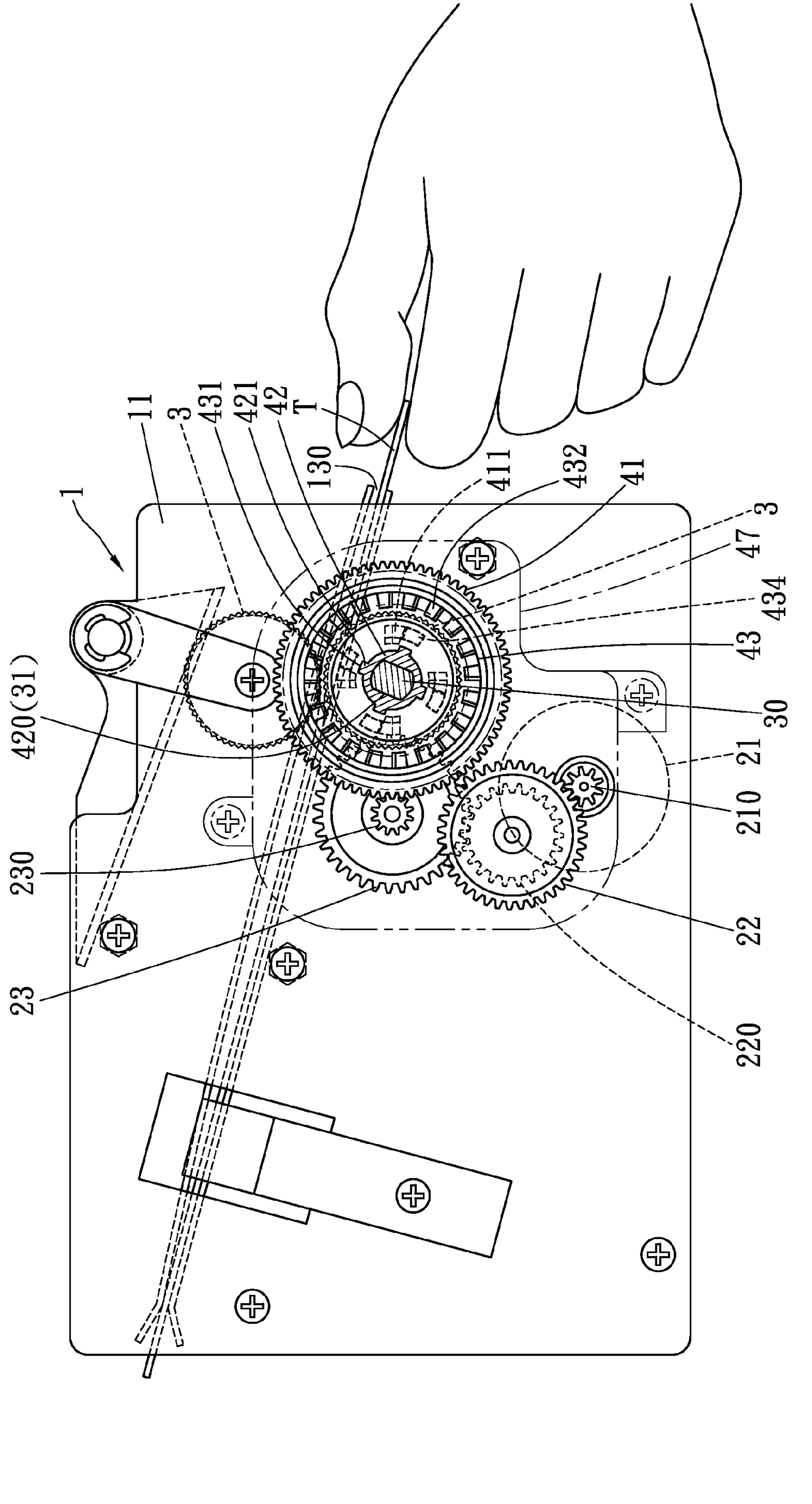
FIG. 7 is a side cross-sectional view of the lottery ticket machine in the present invention, showing that lottery tickets are being illegally drawn out by an external force.
Figure 8:
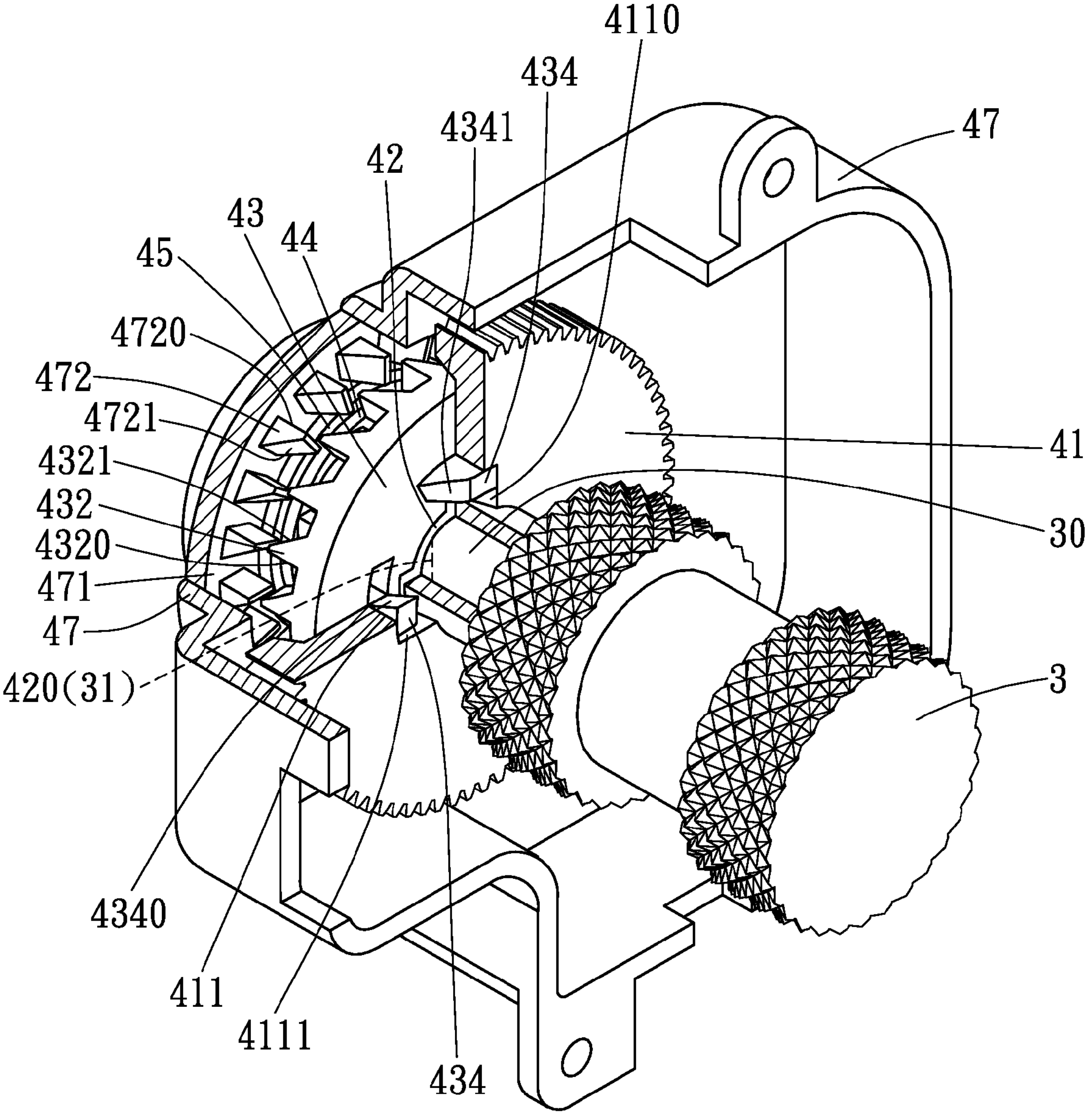
FIG. 8 is a perspective view of the control device operated to be engaged with an outer cover in the present invention.
Figure 9:
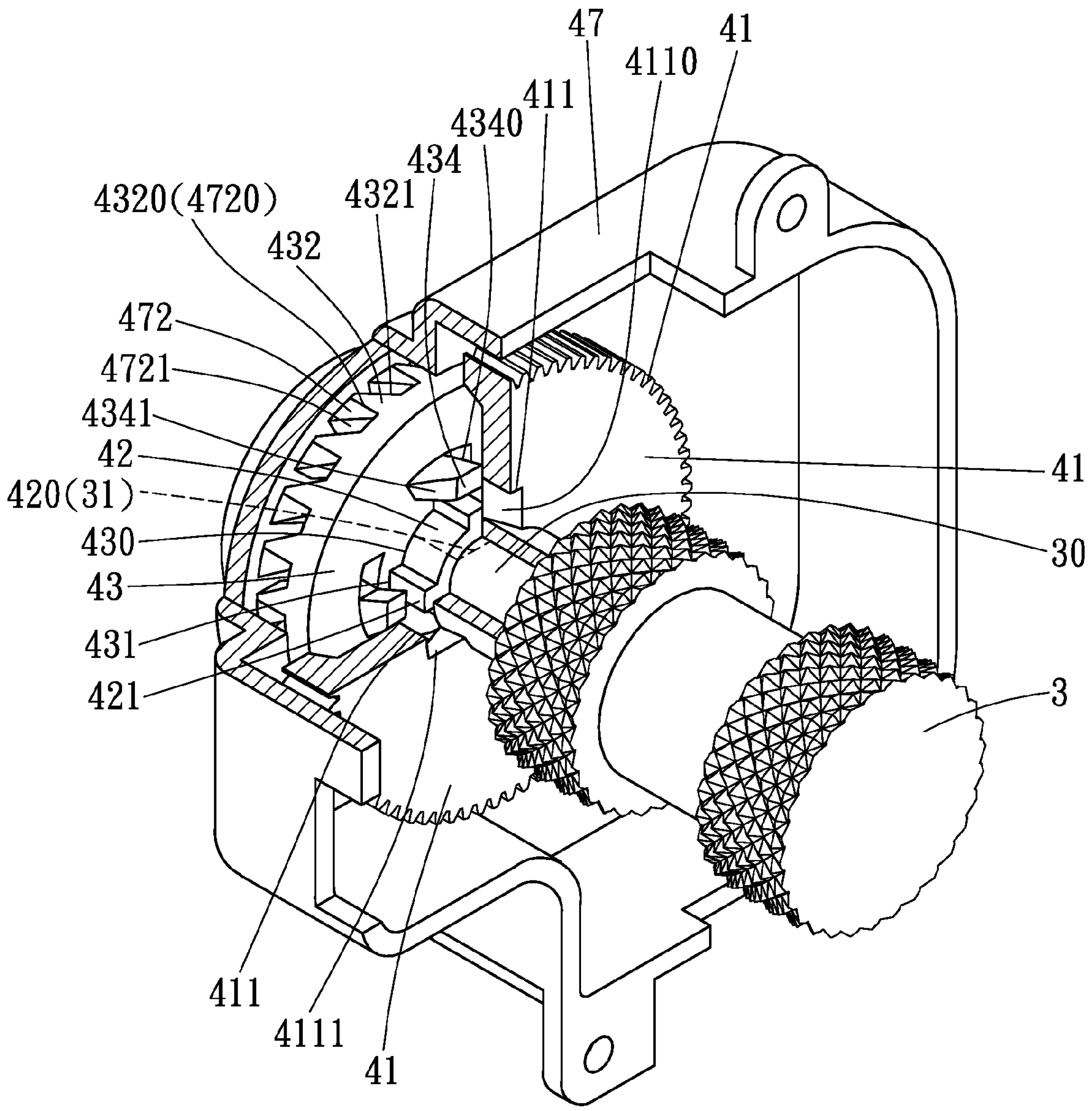
FIG. 9 is a perspective view of the control device engaged with the outer cover in the present invention.
Figure 11:
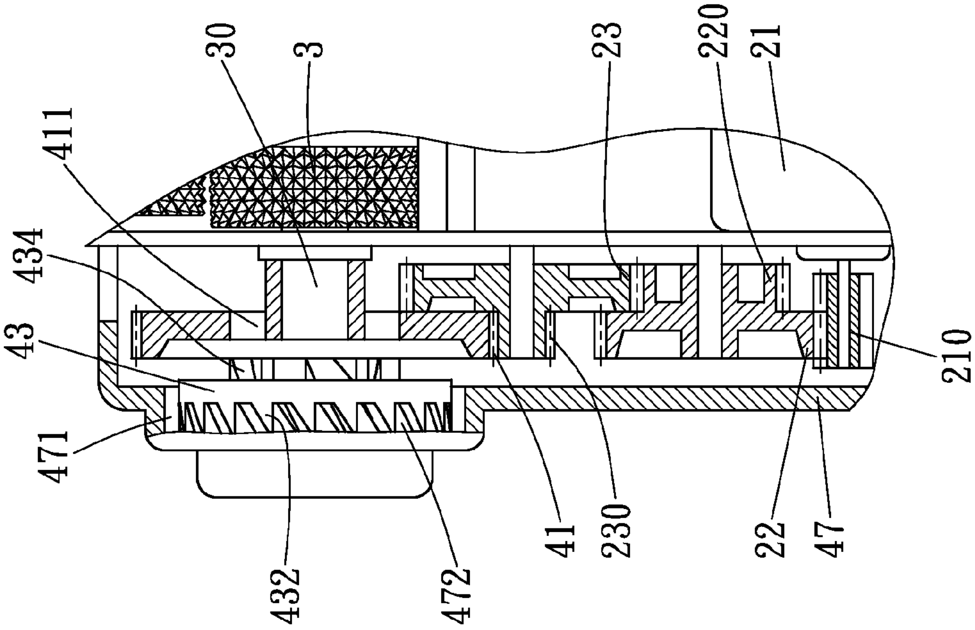
FIG. 11 is a cross-sectional view of the control device engaged with the outer cover in the present invention.
Figure 10:
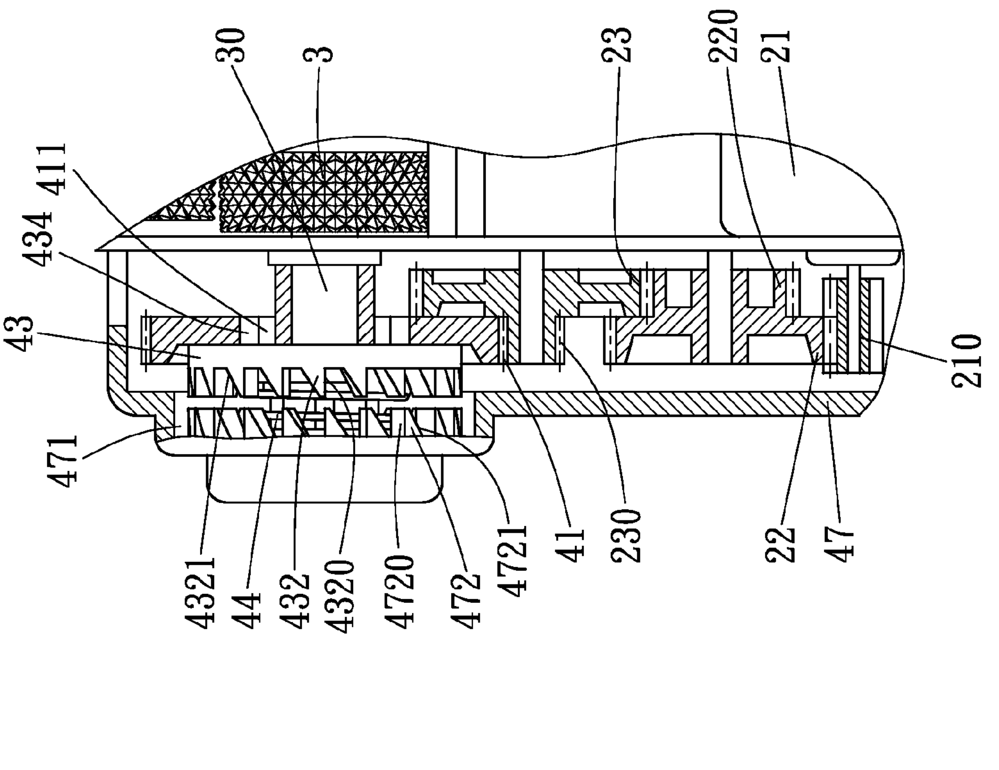
FIG. 10 is a cross-sectional view of the control device operated to be engaged with the outer cover in the present invention.

In operating of rolling and pressing lottery tickets (T), as shown in FIGS. 3, 4 and 5, when the motor 21 of the driving device 2 is started, the driving wheel 22 engaged with the geared shaft rod 210 of the motor 21 will be driven to rotate, with its driving pinion 220 driving the mutually engaged driven gear 23 to rotate and actuate both the rotary gear 41 engaged with the driven pinion 230 and the control wheel 43 combined with the rotary gear 41 to rotate together. Since the bushing hole 430 of the control wheel 43 is firmly fixed with the bushing 42 that is fixedly combined with the combining member 31 of the shaft rod 30 of the press roller 3; therefore, when driven to rotate, the control wheel 43 will actuate the press rollers 3 to rotate. Thus, the press rollers 3 can press and roll the opposite sides of the lottery ticket (T) to form pressed streaks T1 thereon and smoothly send out the lottery ticket (T).

When the lottery tickets (T) sent out reaches a preset number of sheets (calculated according to starting time), a timing device will stop the motor 21 from operating. At this time, if a consumer wants to draw out more lottery tickets (T) and when the lottery tickets are illegally pulled by force, referring to FIGS. 6~11, the press rollers 3 and the shaft rod 30 will be actuated to rotate and drive the control wheel 43 to rotate. Since the control wheel 43 is firmly fitted on the combining member 31 of the shaft rod 30 by means of the bushing 42; therefore, when the control wheel 43 is actuated to rotate by the shaft rod 30, the rotary gear 41 will remain motionless. Simultaneously, the arcuate surfaces 4341 of the projecting member 434 at the rear side of the control wheel 43 will be actuated to slide away from the engage holes 411 of the rotary gear 41 along the arcuate surfaces 4111 of the engage holes 411 and shift forward to compress the spring 44 to force the engage teeth 432 of the control wheel 43 to be engaged with the engage teeth 472 in the recess 471 of the outer cover 47 when the control wheel is rotated at most for one fourth of a circle. Thus, the press rollers 3 is impossible to be rotated, only tightly pressed on the lottery ticket (T) to let the lottery ticket (T) impossible to be drawn out any longer, and hence a consumer can only obtain the lottery tickets (T) that have already been rolled by the press rollers 3, surely attaining effect of preventing lottery tickets (T) from being stolen.

When the lottery ticket machine recovers to a normal operation condition and the motor 21 is started to drive the driving device 2 to rotate, the rotary gear 41 can be actuated to rotate. When the rotary gear 41 is rotated to have its engage holes 411 respectively aligned to the projecting bars 434 of the control wheel 43, the projecting bars 434 will be pushed by the spring 44 to respectively slide into the engage holes 411 to be engaged and positioned therein along the arcuate surfaces 4111 of the engage holes 411 of the rotary gear 41. Thus, the lottery tickets (T) can normally be rolled by the press rollers 3 and smoothly sent out.

While the preferred embodiment of the invention has been described above, it will be recognized and understood that various modifications may be made therein and the appended claims are intended to cover all such modifications that may fall within the spirit and scope of the invention.

What is claimed is:

1. A lottery ticket machine having function of preventing tickets from being illegally drawn out, said lottery ticket machine comprising:

a machine base provided with two side plates respectively bored with threaded holes, one of said two side plates having its outer side secured thereon with pivots, said machine base disposed with a lottery ticket circular passageway in an interior thereof, said lottery ticket circular passageway having its outer end formed with a ticket outlet;

a driving device positioned in said machine base, said driving device composed of a motor, a driving gear and a driven gear;

two press rollers assembled in said machine base, said lottery ticket circular passageway having a part, near said ticket outlet extended forward between said two press rollers, letting opposite sides of a lottery ticket rolled and pressed by said two press rollers; and characterized by one of said two press rollers provided with a shaft, said shaft extending out of said machine base in same direction of said pivots, said shaft having its outer side disposed with a combining member and an engage groove; and a control device fitted on said shaft rod of said press roller, said control device composed of a rotary gear, a bushing, a control wheel, a spring, a bushing cover, a fastener and an outer cover, said rotary gear fitted on said shaft of said press roller and driven to rotate by said driven gear of said driving device, said rotary gear bored with more than one engage hole, said bushing fitted on said combining member of said shaft of said press roller, said bushing having its outer side fixed thereon with more than one projecting ridge, said control wheel fitted on said bushing, said control wheel bored with a bushing hole with a shape the same as a shape of said bushing, said control wheel having its outer side annularly provided with plural engage teeth, said spring received in an inner circumference of said engage teeth of said control wheel, said control wheel having its rear side disposed with more than one projecting bar to be correspondingly engaged with said engage holes of said rotary gear, said bushing cover fitted on said bushing, said bushing cover bored in the center with a bushing hole with a shape matching with that of said bushing, said spring having another end pushing against an inner wall of said bushing cover, said fastener clasped in said engage groove at an outer end of said shaft of said press roller for firmly positioning said control device on said shaft rod of said press roller, said outer cover threadably combined with said side plate of said machine base for covering both said driving device and said control device, said outer cover disposed with a recess in the interior, said recess fixed with lots of teeth in an interior thereof to be correspondingly engaged with said engage teeth of said control wheel; and wherein said bushing hole of said control wheel of said control device has its inner wall disposed with more than one slide groove for engaging said projecting bars of said bushing.

2. The lottery ticket machine having function of preventing tickets from being illegally drawn out as claimed in claim 1, wherein said motor of said driving device is provided with a geared shaft extending out of said machine base, and said driving gear is pivotally assembled with said pivot of said machine base and engaged with said geared shaft of said motor, said driving gear having its rear side mounted with a driving pinion, said driven gear pivotally assembled with said pivot of said machine base and engaged with said driving pinion of said driving gear, said driven gear having its front side set with a driven pinion.

3. The lottery ticket machine having function of preventing tickets from being illegally drawn out as claimed in claim 1, wherein said rotary gear of said control device is bored with a shaft hole in the center, and each said engage hole of said rotary gear has its inner wall formed with a slope at one side along a circumferential direction and disposed with an arcuate surface at another side.

4. The lottery ticket machine having function of preventing tickets from being drawn out as claimed in claim 1, wherein said bushing of said control device is bored with a through hole with a shape matching with that of said combining member of said shaft rod.

5. The lottery ticket machine having function of preventing tickets from being drawn out as claimed in claim 1, wherein each said engage tooth of said control wheel has one side formed with an engage surface and another side formed with a slope, and said bushing hole of said control wheel has its outer circumference bored with a spring groove.

6. The lottery ticket machine having function of preventing tickets from being drawn out as claimed in claim 1, wherein each said projecting bar of said control wheel has one side formed with a slope and another side formed with an arcuate surface.

7. The lottery ticket machine having function of preventing tickets from being drawn out as claimed in claim 1, wherein a gasket is mounted at a front side of said bushing cover of said control device.

8. The lottery ticket machine having function of preventing tickets from being drawn out as claimed in claim 1, wherein said outer cover of said control device is bored with plural threaded holes.

9. The lottery ticket machine having function of preventing tickets from being drawn out as claimed in claim 1, wherein each said engage tooth inside said outer cover has one side formed with an engage surface and another side formed with a slope.

* * * * *